Figure 11:
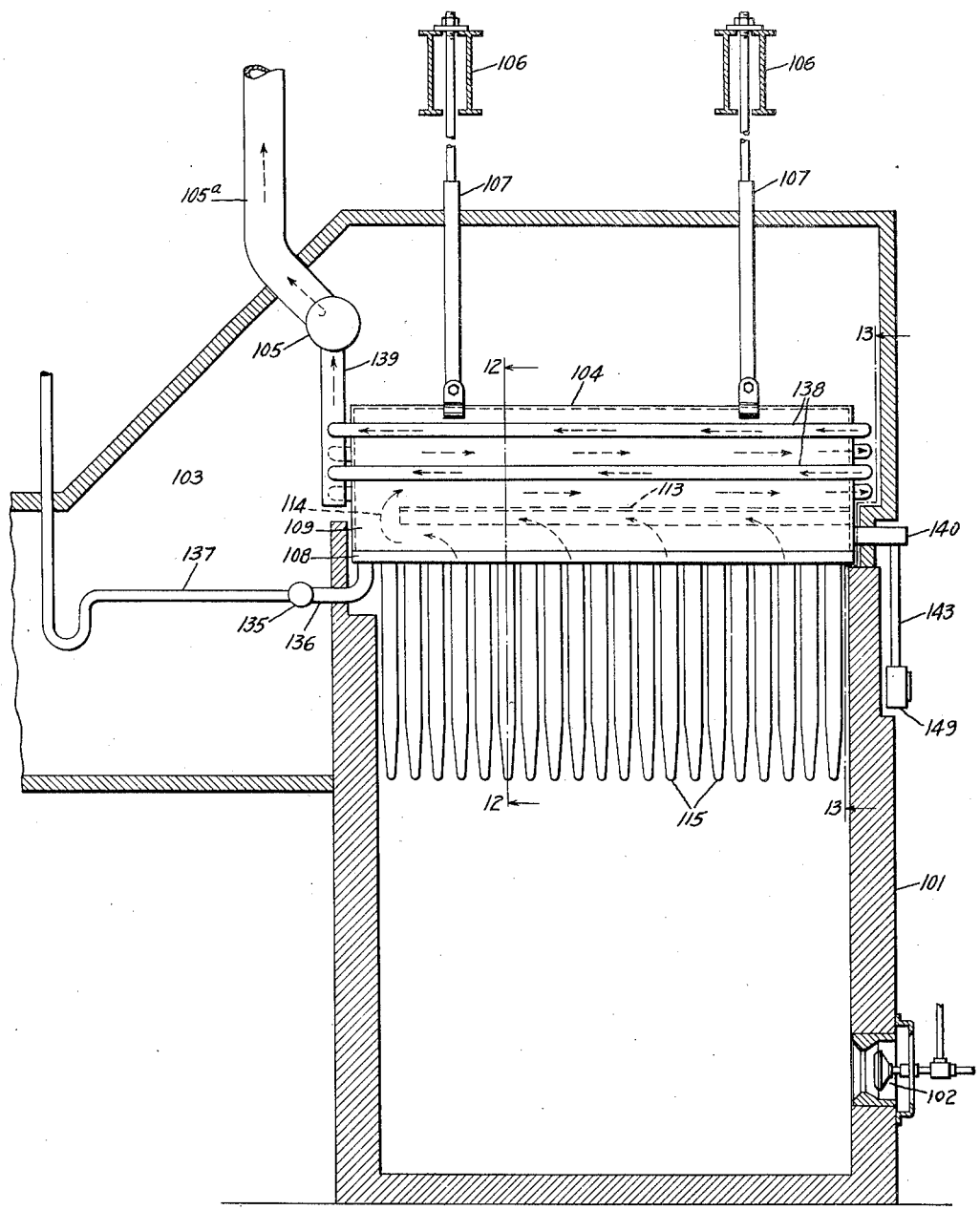

Feb. 20, 1934.  W. L. R. EMMET ET AL  1,948,371
MERCURY BOILER
Filed Sept. 17, 1928   7 Sheets-Sheet 1
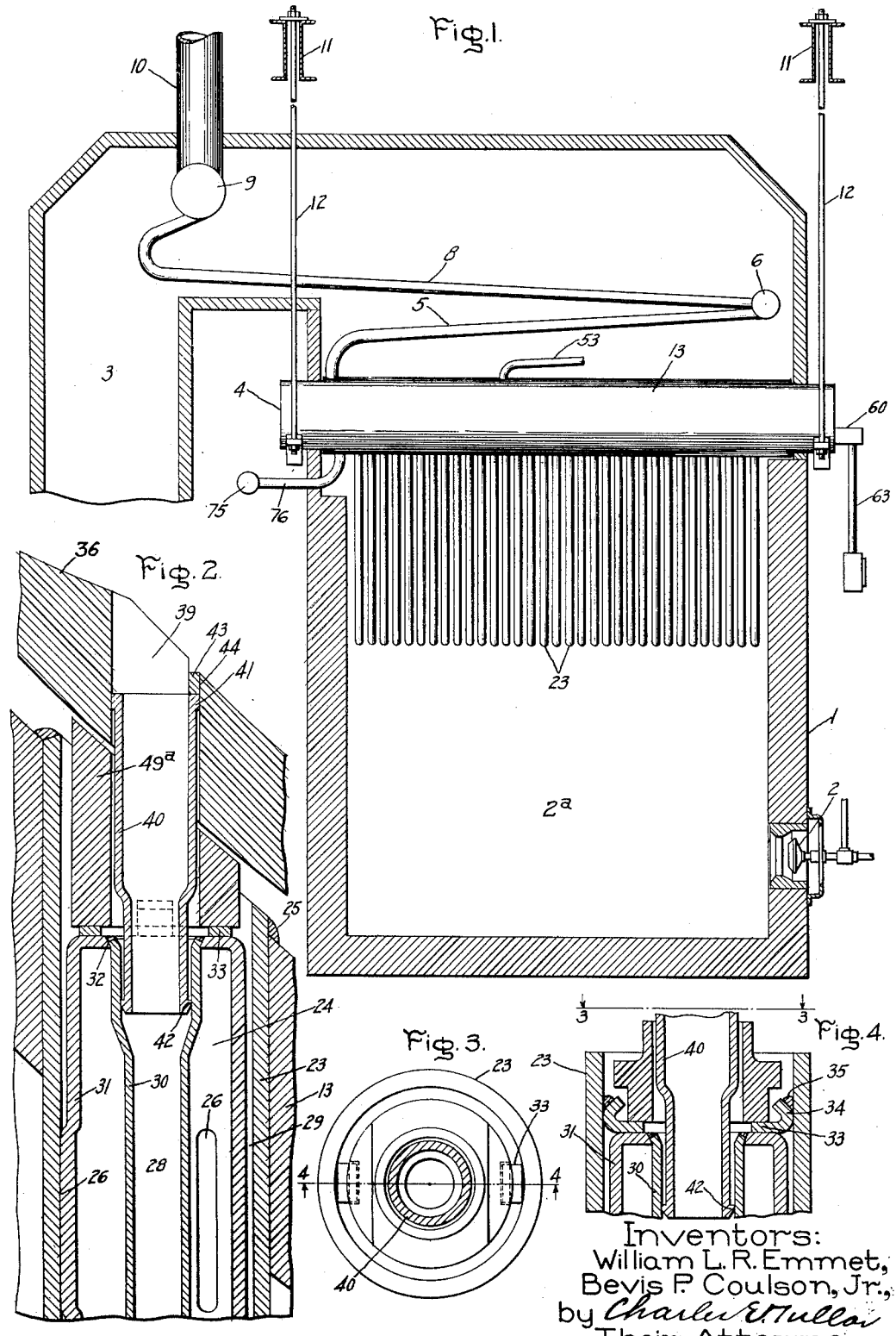

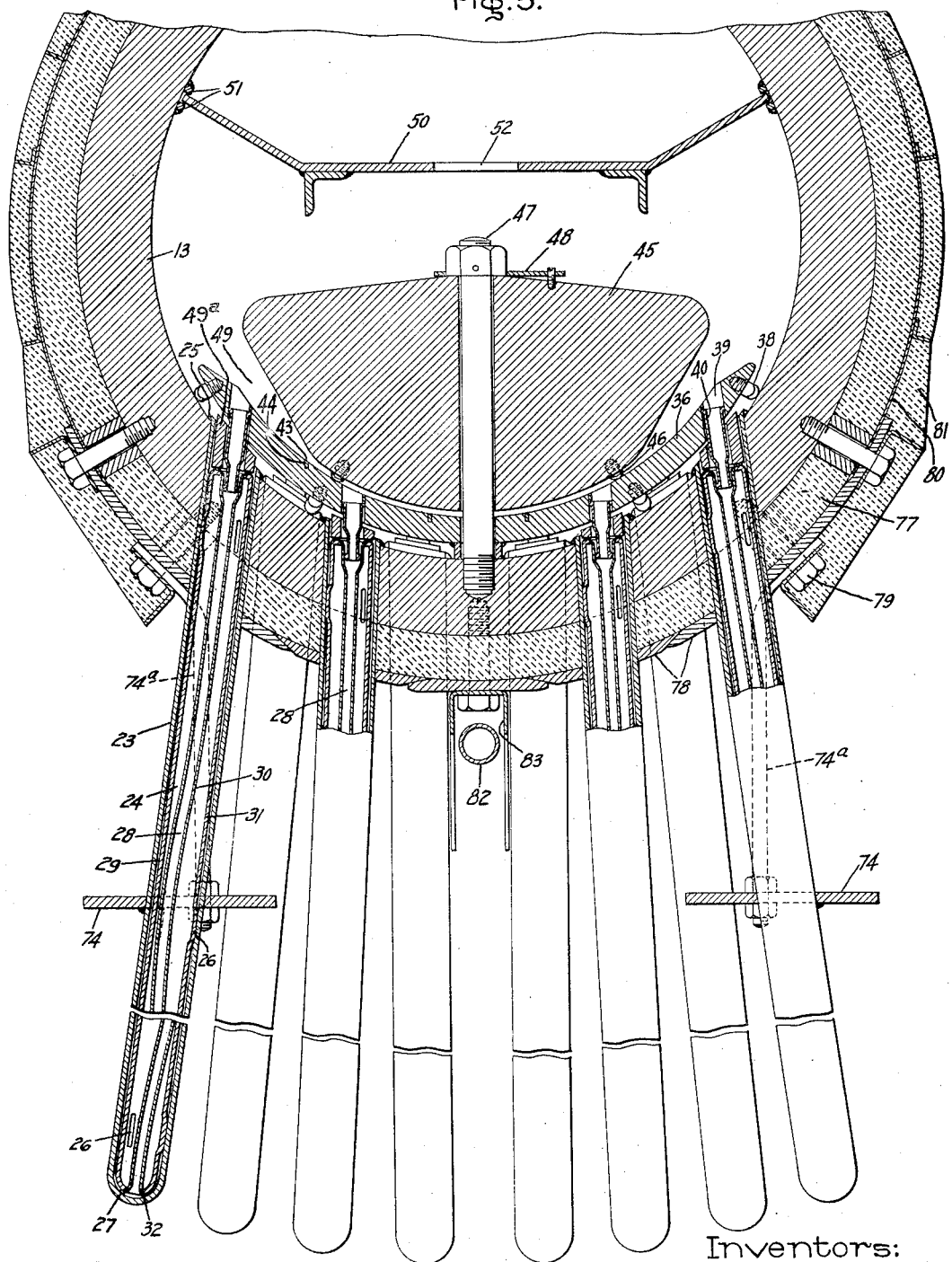

Feb. 20, 1934.   W. L. R. EMMET ET AL   1,948,371
MERCURY BOILER
Filed Sept. 17, 1928   7 Sheets-Sheet 3
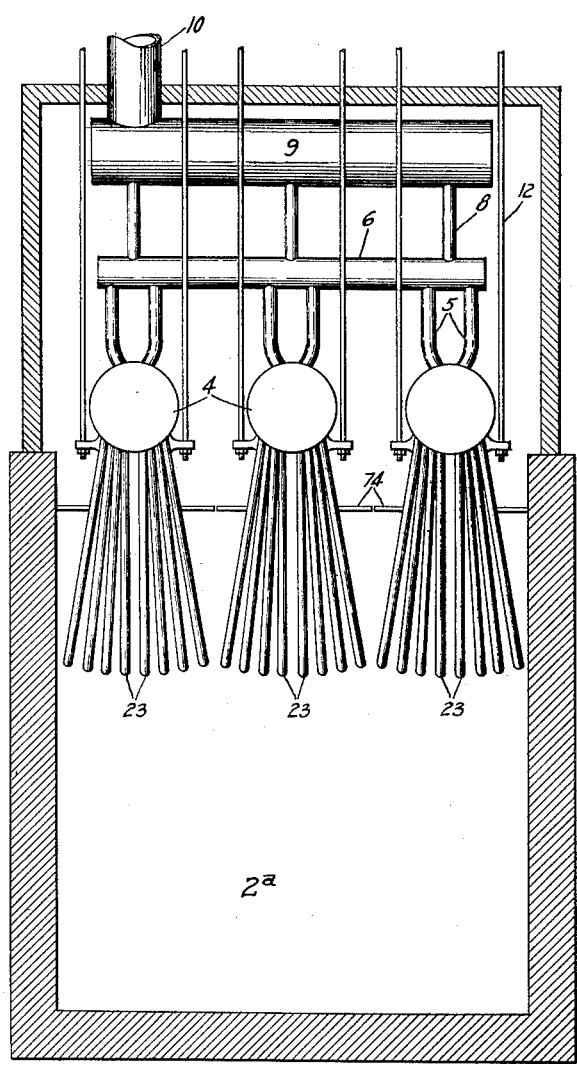
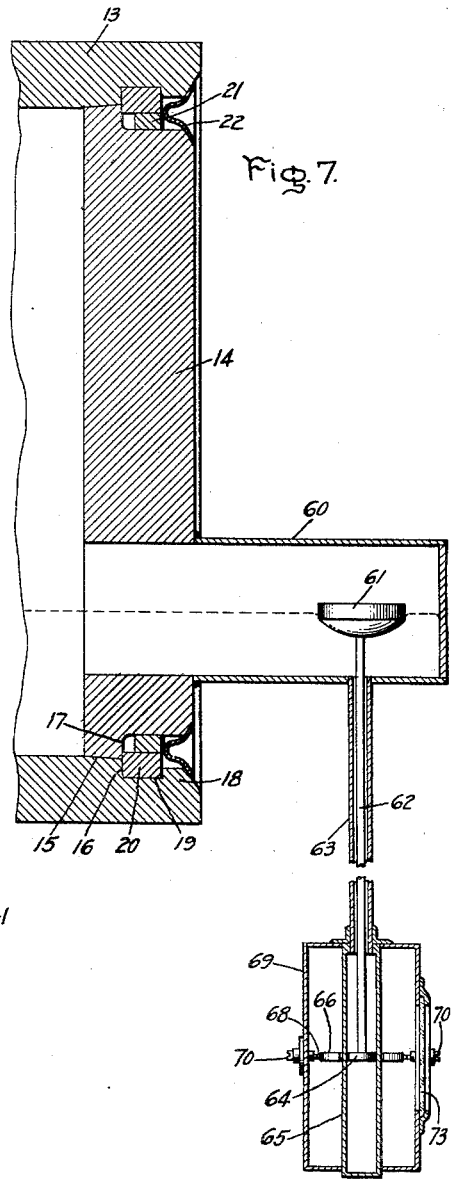
Inventors:
William L. R. Emmet,
Bevis P. Coulson, Jr.,
by Charles W. Tullar
Their Attorney Feb. 20, 1934.   W. L. R. EMMET ET AL   1,948,371
MERCURY BOILER
Filed Sept. 17, 1928   7 Sheets-Sheet 4
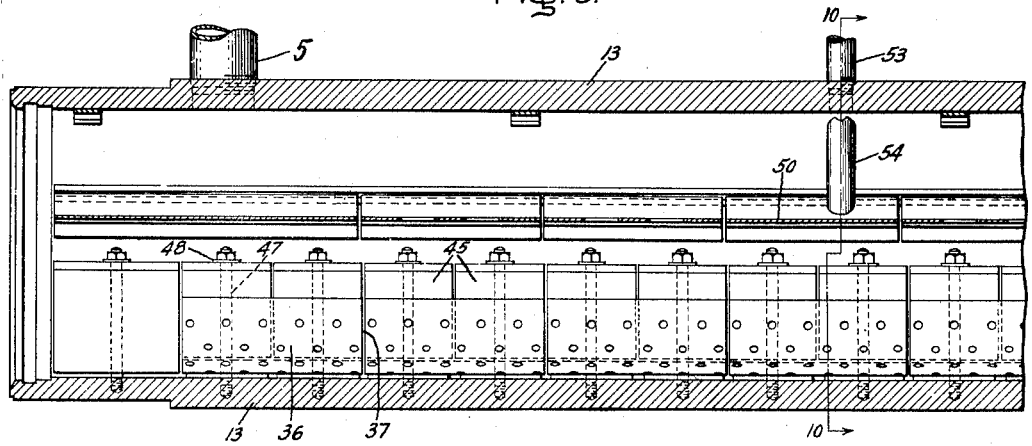
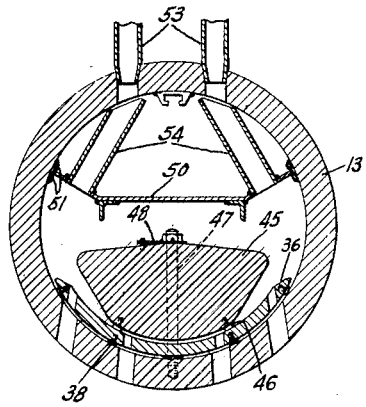
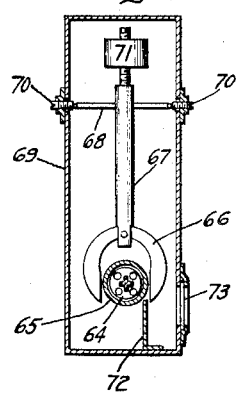
Inventors:
William L. R. Emmet,
Bevis P. Coulson, Jr.,
by Charles V. Tullar
Their Attorney.

Feb. 20, 1934.  W. L. R. EMMET ET AL  1,948,371
MERCURY BOILER
Filed Sept. 17, 1928   7 Sheets-Sheet 5

Inventors:
William L.R.Emmet,
Bevis P. Coulson Jr,
by Charles E. Tullar
Their Attorney.

Feb. 20, 1934.　　W. L. R. EMMET ET AL　　1,948,371
MERCURY BOILER
Filed Sept. 17, 1928　　7 Sheets-Sheet 6
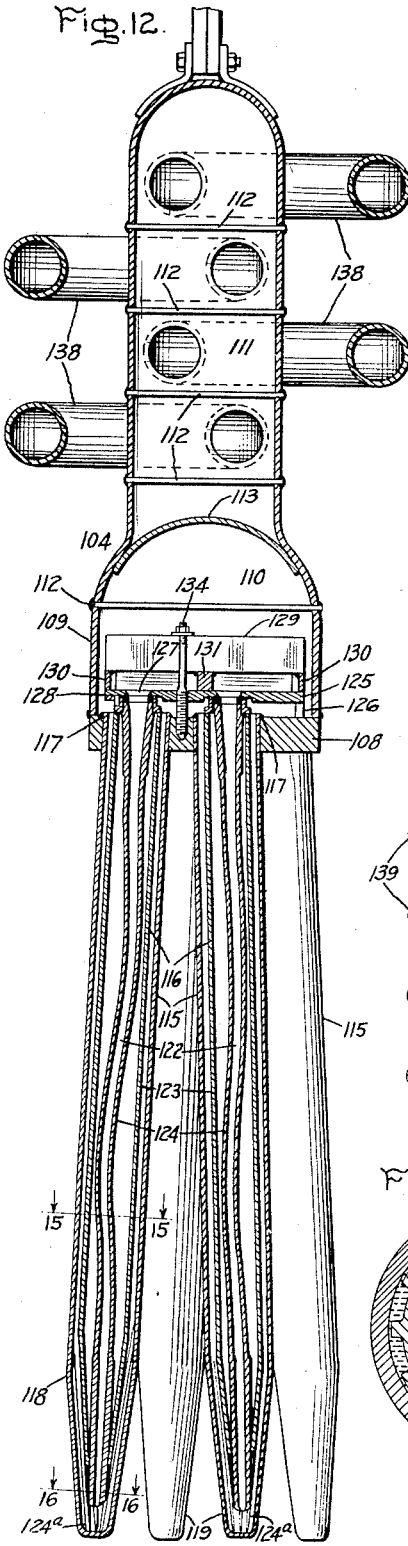
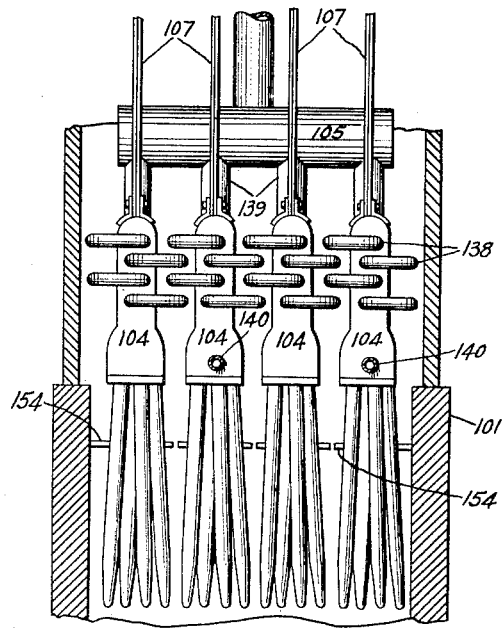
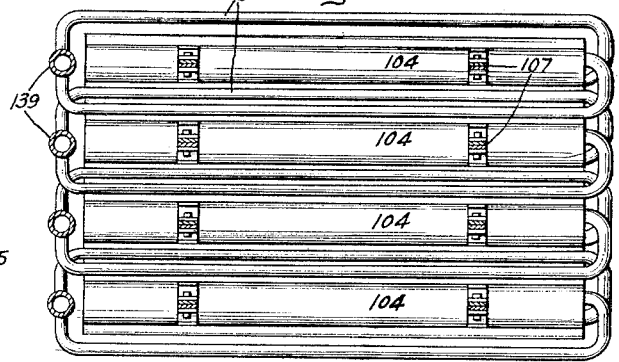
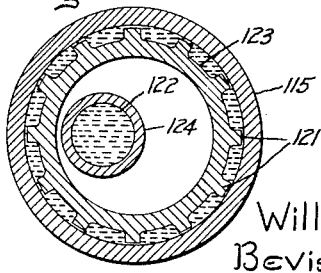
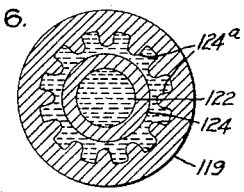
Inventors:
William L.R. Emmet
Bevis P. Coulson, Jr.
by Charles E. Mullan
Their Attorney.

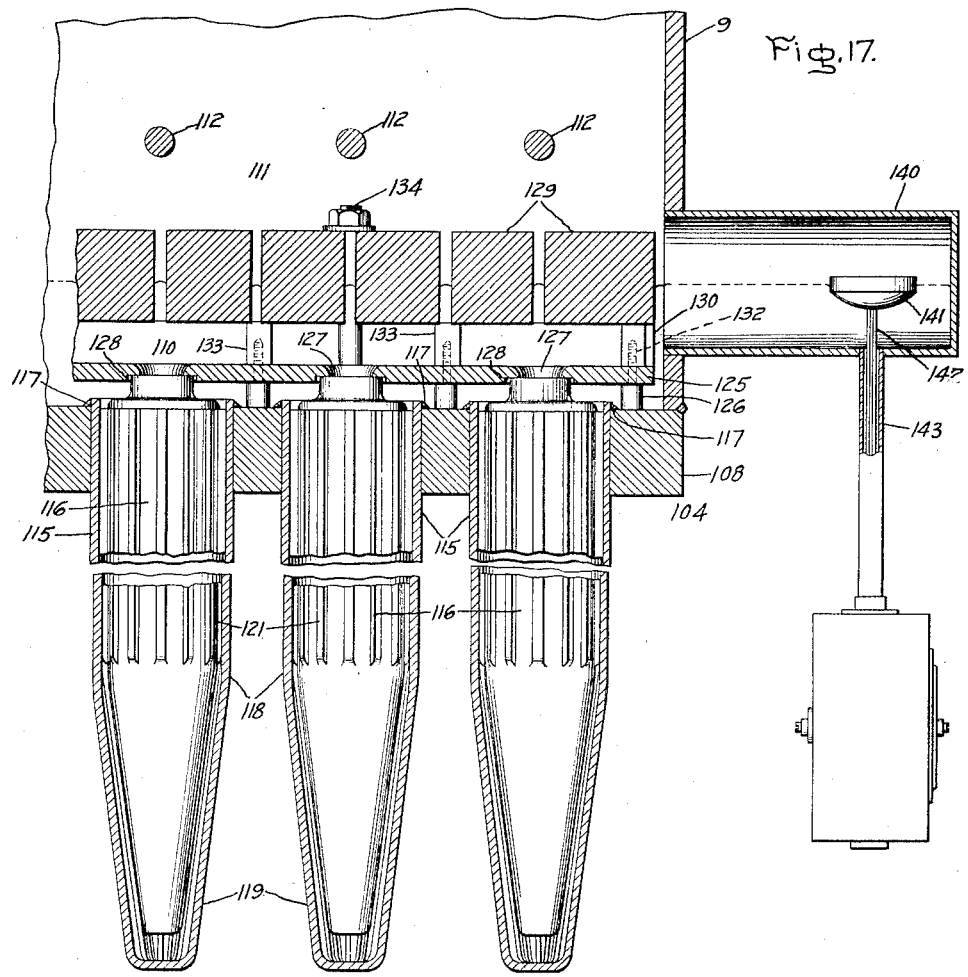
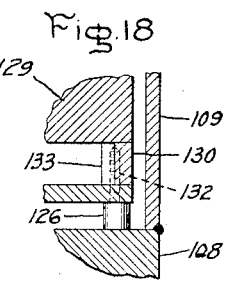

Patented Feb. 20, 1934

1,948,371

UNITED STATES PATENT OFFICE 1,948,371

MERCURY BOILER

William L. R. Emmet and Bevis P. Coulson, Jr., Schenectady, N. Y., assignors to General Electric Company, a corporation of New York Application September 17, 1928
Serial No. 306,486

13 Claims. (Cl. 122—312)

This application is a continuation in part of our application Ser. No. 69,940, filed November 18, 1925.

The invention relates to mercury boilers, that is to say, to boilers for generating mercury vapor.

The problems involved in constructing a mercury boiler are entirely different from those met with in water boilers. In the first place, mercury is relatively expensive so that the quantity in the system must be kept at a minimum, thus requiring small liquid spaces in the boiler, while water is plentiful and may be used in such quantities as is found desirable. Again, mercury does not wet a metal surface which means that the liquid mercury must be brought repeatedly into contact with the metal surface to absorb heat from it while water wets the surface which means that the water on the surface of the steel is easily vaporized and the surface again wetted. Also, mercury liquid, while it is an excellent agent for the absorption of heat from a metal surface, has a very low specific heat which means that it will absorb little heat before vaporizing. Boiling mercury is a relatively poor agent for removing heat from a metal surface because mercury does not wet the surface, and when boiling, a skin of mercury vapor is inclined to get between the liquid mercury and the metal surface thus preventing the direct transfer of heat from the metal surface to the liquid mercury; and mercury vapor itself is not a good agent for removing heat from a metal surface. Liquid mercury will absorb heat from a metal surface at a rate of an order of ten times as rapidly as will boiling mercury, that is to say, a mixture of mercury vapor and mercury liquid. These conditions necessitate a very rapid circulation of the liquid mercury in the boiler and require the continuous presence of liquid mercury on surfaces where heat application is greatest in order to prevent the burning out of the boiler tubes. This condition of greatest heat application is found on portions of the surface subject to direct radiation from the furnace, radiant heat delivery being far more rapid than other heating effects in a boiler.

Also, mercury has a relatively high boiling point so that high temperatures must be dealt with.

In addition to the foregoing, since mercury is relatively expensive and also since its vapors are poisonous, it is very important that the boiler be absolutely tight and leak-proof. At the same time, however, the mechanical design of the boiler must be such that it can be built advantageously and readily dismantled for repairs.

The object of our invention is to provide an improved structure and arrangement in a boiler for vaporizing mercury, and for a consideration of what we believe to be novel and our invention, attention is directed to the accompanying description and the claims appended thereto.

According to our invention, we provide a mercury boiler comprising a plurality of spaced, depending boiler tubes which are located directly over the fire in the furnaces so that the whole surface of the tubes receive radiant heat, the lower ends of the tubes, however, being exposed to direct radiation, receive heat at a very high rate. We provide for a rapid circulation of mercury in the tubes and for the maintenance always of non-boiling liquid mercury in the lower ends of the tubes which are exposed to the most intense heat delivery. This may be accomplished by placing in each tube a thick-walled heat-insulated core which has a central passage for the down-flow of liquid mercury and which defines with the inner surface of the tube an annular passage for the up-flow of liquid mercury and vapor. The thick-walled core is constructed so as to be a poor conductor of heat whereby it serves to protect the mercury flowing through it to the bottom of the tube from becoming heated. The result is thus obtained that comparatively cool mercury is supplied to the bottom of the tubes. Owing to the difference in pressure of the mercury between the top and bottom of the boiler tube due to the static pressure of the mercury column therein, the boiling point of the mercury at the bottom of the tube is substantially higher than that of the mercury at the top of the tube. This difference may be of the order of from 30° F. to 60° F. This means, therefore, that the liquid mercury at the bottom of the tube is capable of absorbing a larger amount of heat before it begins to vaporize and the result is obtained that because of this higher boiling temperature and because of the rapid circulation of the mercury in the tube, actual boiling of the mercury and formation of mercury vapor does not take place at the bottom of the tube but begins to occur only some distance up the tube, the vapor being formed due to increase in temperature of the liquid and the gradual release of pressure.

The tubes are spaced apart and are preferably flared at their bottoms so as to give the best radiant heat delivery to the full length of the tubes and the desired distribution of the heat along the tubes and suitable gas velocities between the tubes. In this connection, it is desirable that the lower ends of the tubes where boiling does not occur, be exposed to intense radiant heat because due to the pressure of the liquid mercury such portions of the tubes are capable of absorbing large quantities of heat, and that the remaining portions of the tubes be exposed to gradually lessened rates of heat delivery. By a suitable flaring arrangement of the tubes the desired distribution of heat to the tubes may be obtained, it being clear that if the flaring is increased the penetration of the radiant heat up the tubes is increased, especially directly adjacent to the lower end of the tubes. As is known, transfer of heat by radiation is rapid compared to transfer of heat by convection, so that a large portion of the heat transferred to the mercury is effected by means of radiation.

We have found that liquid mercury in contact with a metal surface is capable of absorbing heat at an exceedingly high rate as long as the mercury is kept from boiling. By the arrangement described, therefore, whereby the ends of the tubes are exposed directly to the most intense radiant heat of the furnace and whereby non-boiling mercury is maintained in the bottoms of the tubes, heat can be transferred from the furnace to the mercury at a very high rate.

The boiler is formed preferably of a number of units, each unit comprising a relatively narrow header or drum with the flared tubes depending therefrom. The headers are spaced apart so as to effect an equal spacing of the lower ends of the tubes and to provide sufficient space between the headers for the flow of the flue gases up between them. We provide baffle plates so located as to give a fairly high gas velocity between the baffle plates and the headers, giving sufficient resistance to the gases to insure their equal distribution over all the boiler units. The baffles prevent the gases from short-circuiting the tubes and passing directly between the headers. By the arrangement of baffles provided, the gases tend to pass upward substantially parallel to the tubes. By this arrangement nearly equal gas and heat distribution throughout the boiler is obtained.

It will thus be seen that by our invention, we obtain a construction wherein each tube receives approximately equal radiant heat from the fire and also equal amounts of heat from the gases passing over the tubes, and wherein in connection with each tube the desired distribution of heat along the tube is obtained, the heat concentration on the tube decreasing gradually from the bottom of the tube.

In order to prevent the walls of a furnace from becoming overheated, it is necessary that the temperatures to which the walls are subjected be kept below a certain maximum value. This desirable result is accomplished by our invention, and without detracting from the efficiency of the furnace in that the tubes, the ends of which are exposed directly to the furnace fire, are capable of absorbing radiant heat at such a high rate that the temperatures to which the furnace walls are subjected are kept within permissible limits.

We regard the arrangement in a mercury boiler wherein the lower ends of the boiler tubes are exposed directly to the most intense radiant heat of the furnace and wherein there is supplied to such ends a sufficient quantity of relatively cool mercury under a static head such that it is capable of absorbing a relatively large amount of heat before it begins to boil as being an important feature of our invention.

Other features of our invention have to do with the mechanical construction of the boiler.

In the drawings, Fig. 1 is a vertical sectional view of a boiler embodying our invention; Fig. 2 is a detail sectional view on an enlarged scale of the upper portion of one of the boiler tubes; Fig. 3 is a detail plan view taken on line 3—3, Fig. 4; Fig. 4 is a detail sectional view taken on line 4—4, Fig. 3; Fig. 5 is a transverse sectional view through one of the boiler units; Fig. 6 is an end view of the boiler, the furnace wall being shown in section; Fig. 7 is a detail sectional view of one end of one of the boiler drums; Fig. 8 is a detail view of a liquid level gauge; Fig. 9 is a longitudinal sectional view of a portion of one of the boiler drums showing its interior construction, the boiler tubes being omitted from the view; Fig. 10 is a sectional view taken on line 10—10, Fig. 9; Fig. 11 is a vertical sectional view of a modified form of boiler embodying our invention; Fig. 12 is a transverse, sectional view on a larger scale of one of the boiler units, the section being taken on line 12—12, Fig. 11; Fig. 13 is a detail view taken on line 13—13, Fig. 11, looking in the direction of the arrows; Fig. 14 is a top plan view of the boiler units shown in Fig. 13; Fig. 15 is a detail sectional view of one of the boiler units, the section being taken on line 15—15, Fig. 12; Fig. 16 is a detail sectional view of one of the boiler tubes taken on line 16—16, Fig. 12, Fig. 17 is an enlarged detail sectional view of a part of a boiler unit, the intermediate portion of the tube being broken away, and Fig. 18 is a detail sectional view of a part of a boiler unit.

Referring to the drawings, Figs. 1 to 10 inclusive, 1 indicates the furnace in which the boiler is mounted. Any suitable fuel may be burned in it. In the present instance, it is shown as being an oil-fired boiler, 2 indicating an oil burner and 2a the combustion chamber. The products of combustion pass vertically upward to the top of the furnace and are discharged therefrom laterally through a conduit 3.

The boiler comprises a number of units 4 each complete in itself. These units are mounted side by side in the furnace and are arranged to deliver elastic fluid in parallel through pipes 5 to a common header or drum 6 located at the forward end of the furnace. From header or drum 6 the elastic fluid is conveyed through pipes 8 to a second header or drum 9 located at the rear of the furnace. Connected to header or drum 9 is a conduit 10 through which elastic fluid is conveyed to a point of consumption which may be for example, an elastic fluid turbine. The arrangement of the pipes 5 and 8 and the headers 6 and 9 provides a reverse bend in the conduit means for conveying the elastic fluid from the boiler units 4 to the header 9. The purpose of this arrangement is to provide for expansion and contraction of the discharge conduit 10, the pipes 5 and 8 moving toward and away from each other when conduit 10 expands and contracts. The boiler units may be supported in the furnace in any suitable manner. In the present instance they are shown as being suspended from I-beams 11 by means of hanger rods 12.

Each boiler unit comprises a casing shown as a cylindrical drum 13 closed at its ends by removable heads 14, the heads being made removable so that access may be obtained readily to the interior of the drums. In this connection, it is important that the heads while being removable shall be, at the same time, vapor-tight under all conditions of operation and for this purpose there is provided an improved arrangement for fastening the heads into the drums.

Referring particularly to Fig. 7 which shows an end of one of the drums, it will be seen that the end of the drum is provided with a slightly tapered seat 15 with which engages a correspondingly tapered seat on head 14. Outside seat 15 the drum and head are cut away to provide shoulders 16 and 17 respectively. Beyond shoulder 16 drum 13 is provided with an inwardly-projecting lip 18 thereby providing an annular, inwardly-facing groove 19 in drum 13. Located in groove 19 is a holding ring 20. This may be a single continuous ring which is split transversely to permit of its being inserted into groove 19, or it may be made up of two or more sections so as to enable it to be inserted in the groove. Holding ring 20 is fastened in groove 19 by a locking ring 21 located between ring 20 and the adjacent surface of head 14. Ring 19 overlaps surface 17 on head 14 so as to hold the head in position in the drum. To render the joint fluid-tight the space between the drum and the head is sealed by means of an annular ring 22 U-shaped in cross section which may be formed of relatively thin material and which at its two edges is welded to drum 13 and head 14. Since ring 22 is U-shaped in cross section, it will be seen that it is capable of yielding in a radial direction in case of expansion and contraction of the drum 13 and head 14 relatively to each other. At the same time, being U-shaped in cross section, and arranged as shown, it is capable of withstanding outwardly applied pressure. It serves to seal the joint against leakage even though the engaging surfaces between drum 13 and head 14 do not remain absolutely leakage-proof. With this construction, the rings 20 and 21 serve as a means for mechanically connecting the head to the drum and carry the load due to the pressure within the drum while the U-shaped annular ring 22 forms a sealing means which is not required to carry any of the load due to the pressure in the drum.

Depending from the underside of each drum 13 are a number of boiler tubes each comprising an outer tube 23 in which is located a tubular core 24. Outer tubes 23 are closed at their lower ends, being provided with rounded bottoms and at their tops they are fastened in openings in drum 13 preferably by welding as is indicated at 25. Each core 24 comprises a thick walled tube of the same general contour as the outer tube. It is held in spaced relation to the outer tube by suitable means such as a number of short, longitudinally-extending ribs 26 which may be formed by pressing outwardly some of the metal of the core. The lower end of core 24 terminates short of the bottom of tube 23, being held in spaced relation to the bottom of tube 23 by one or more spacers or projections 27. (See Fig. 5.) With this arrangement, it will be seen that the passage through the core, which passage is designated 28, communicates at its lower end with the annular passage 29 formed between the core and the inner surface of outer tube 23.

Cores 24 may be formed with advantage from two spaced tubes 30 and 31 welded together at their upper and lower ends as is indicated at 32 in Figs. 2 and 5 of the drawings. The dead space between tubes 30 and 31 is preferably filled with air, although it may be filled with some other substance. The purpose of this is to provide an effective heat insulation between the passage 28 through the inner tube and the outer tube to prevent the transfer of heat to the liquid while flowing down through passage 28. This is important in a mercury boiler, it being essential as pointed out above that a large quantity of relatively cool mercury be delivered continuously to the end of the tube which is exposed to heat radiation, because mercury when not boiling is a much better heat remover than it is when boiling. The inner tube 30 is curved or bent between its ends as is illustrated in Fig. 5 so that it may give in case of unequal expansion between tubes 30 and 31 thus avoiding expansion strains and subjecting the welds at the ends of the tubes to stresses of a high order.

The projections 26 on cores 24 engage outer tubes 23 with a sliding fit and due to the fact that mercury is a heavy liquid the cores would tend to float upward when the boiler is in operation. To avoid this, there is provided means for holding the cores down in the outer tubes. This means, best shown in Figs. 2, 3 and 4, comprises a washer 33 which rests on the flat top of the core and is provided with outwardly-projecting inturned ears 34 which engage the inner surface of outer tubes 23 and are welded thereto as is indicated at 35 in Fig. 4. By this arrangement the cores are readily fastened down in the tubes and at the same time if required they can be readily removed by opening the welds 35. The use of a separate member such as the washer 33 welded at two or more points to the outer tube for holding the core in position is of substantial advantage from a mechanical standpoint in connection with the assembling and dismantling of the cores in the tubes.

Located inside drum 13 and in spaced relation to its lower inner surface is a baffle plate 36. Baffle plate 36 is curved to conform to the contour of drum 13 and is preferably formed in a plurality of sections to facilitate the assembly of the structure. This sectional construction is shown particularly in Fig. 9 where 37 indicates the lines of demarcation between sections. The sections of the baffle plate are held in spaced relation to the inner surface of the drum by projections 38 (see Fig. 5) which may be in the form of heads on the ends of studs screwed into the baffle plate. The baffle plate is provided with passages 39 through which liquid mercury flows to the core passages 28. It is important that the flow of liquid mercury through passages 39 to the core passages 28 be continuous and uninterrupted for should an interruption in the flow to a tube occur it may result in a burning out of such tube. For manufacturing reasons, however, it is not practical to form a rigid connection between the upper ends of the cores and the baffle plate. Accordingly, for conveying liquid mercury from passages 39 to core passages 28 there are provided sleeves 40 which have a sliding fit in the baffle plate openings 39 and in the upper ends of the core passages 28, and are arranged so that slight misalignment can occur without disturbing or disrupting the connection. To this end, sleeves 40 are provided with flanges or collars 41 and 42 at their upper and lower ends, (see Fig. 2) which provide flat surfaces of limited extent which engage the surfaces of the baffle plate passages 39 and tube passages 28. This serves to provide a sort of universal joint or connection between the parts permitting them to move angularly relatively to each other to a limited extent while still maintaining a fluid-tight connection. As a result, working of the tubes or slight misalignments will not disrupt the connection between passages 39 and 28, a thing which might result in flow of vapors from passage 29 interfering with the flow of liquid to passage 28. This specific arrangement for connecting the cores 24 to the baffle plate is not claimed specifically herein as it forms the subject matter of an application of Anthony J. Nerad, Serial No. 306,467, filed of even date herewith.

Sleeves 40 must be fastened in passages 39 against vertical movement and for this purpose there are provided longitudinally-extending strips 43 which fit into grooves 44 which run lengthwise of baffle plate 36. Passages 39 are arranged in longitudinal rows the passages of adjacent rows being staggered relatively to each other. By forming continuous grooves 44 running lengthwise of the baffle plate, there being one groove for each row of tubes, all the sleeves 40 of one row of tubes may be fastened in position by a continuous strip 43 which may be with advantage formed in sections, for example as many sections as there are sections to the baffle plate 36. This arrangement is of substantial advantage from a manufacturing standpoint in initially assembling the structure and also in dismantling it.

Arranged above baffle plate 36 is a liquid displacement structure comprising a plurality of blocks 45, there being in the present instance two blocks for each baffle plate section, as will be seen by reference to Fig. 9. The blocks 45, which may be termed filler blocks, are held in spaced relation to the baffle plate by means of spacers 46 which may be in the form of heads on the ends of studs screwed into the blocks. The blocks are held against the baffle plates by means of studs 47 which screw into boiler drum 13. These studs serve also to hold the baffle plate section in position. In other words, they attach both the filler blocks and the baffle plate sections to the drum. In Fig. 5, 48 indicates a locking means for the nuts on studs 47. Between the filler blocks and the baffle plate is a curved passage 49 through which liquid mercury is fed to the passages 39 in the baffle plate.

The purpose of the filler blocks 45 is to decrease the amount of liquid required to fill the lower portion of the liquid space. By the use of filler blocks the required depth of mercury is provided without requiring a large quantity of mercury. Also, the filler blocks serve to provide an arrangement whereby comparatively small variations in the amount of liquid present in the boiler will effect a comparatively large movement of the liquid level. This is desirable because the boiler is operated with the least possible amount of liquid and it is important that a sufficient supply be always present. With the arrangement illustrated comparatively small variations in the actual amount of liquid present in the boiler produces a comparatively large change in the level of the liquid in the boiler and hence of the position of the liquid level indicator. Filler blocks 49a surrounding sleeves 40 are provided for filling partially the spaces just above cores 24 so as to decrease the size of the passages at these points and hence the amount of mercury required for filling them.

Arranged in the upper portion of the boiler drum is a separating means for separting particles of liquid mercury from the mercury vapor as the vapor flows toward the discharge pipes 5. This separating means comprises a plate structure formed of a number of plate sections 50 supported in grooves formed between strips 51 welded to the inner surface of the boiler drum and provided with spaced openings 52 through which the vapor must flow in order to reach the outlet pipes 5. This means that the vapor in flowing to outlet pipes 5 must make one or more turns which results in effecting a separation of the mercury particles. The sides of plate sections 50 slope downwardly so that any mercury accumulating on top of them will run back through openings 52 to the liquid space of the boiler. Preferably the plate section or sections directly adjacent to the inlets to pipe 5 are not provided with openings 52 in order to do away with the possibility of any vapor flowing directly through openings 52 to the pipes 5.

Liquid mercury is supplied to the boiler drum through feed pipes 53 which supply the liquid to conduits 54 (see Figs. 9 and 10) which convey it to the space beneath plate sections 50. Pipes 53 may lead from any suitable source of liquid supply.

Connected to one or more of the boiler units is a liquid level gauge for indicating the level of the liquid in the boiler. For example, a gauge may be connected to every second unit. Each gauge (see Figs. 7 and 8) comprises a sealed casing 60 which communicates with drum 13 in the region of the liquid level in drum 13 and is of a vertical height at least equal to the limits between which the level of the liquid fluctuates in the unit under normal operating conditions. Liquid thus stands in casing 60 at the same height as the liquid in the unit. In casing 60 is a float 61 which rides on the liquid. Connected to float 61 is a rod 62 located in a sealed tube 63 and carrying on its lower end a small block 64, of magnetic material. The lower end 65 of tube 63 is formed of non-magnetic material, this being the portion of the tube in which block 64 is located. Projecting around end 65 in the plane of block 64 is a horse-shoe shaped magnet 66 carried on the end of a rod 67. Rod 67 is fastened to a spindle 68 pivoted in the sides of a casing 69 in bearings 70. On its end remote from magnet 66 rod 67 is provided with an adjustable counter balancing weight 71. In casing 69 is a scale plate 72 over which one of the forks of magnet 66 moves to indicate the position of float 61, the scale plate being visible through a glazed window 73.

The tubes of each boiler unit are flared an amount to enable the boiler surface to absorb the greatest heat from the fire and the boiler units are mouned in the furnace sufficiently far apart to effect an equal spacing at the lower ends of the tubes. Between the groups of tubes are baffles 74 located well above the lower ends of the tubes and supported by rods 74a. The baffles are located to give a fairly high gas velocity between the baffles and the headers, giving sufficient resistance to the gases to insure their equal distribution over all the boiler units. The baffles prevent the gases from short-circuiting the tubes and passing up directly between the headers. With the baffle arrangement, the gases tend to pass upwards parallel to the tubes. The result is thus obtained that each tube receives approximately equal amounts of heat from the gases.

It is desirable to maintain the liquid levels in the several boiler units at the same height and for this purpose there is provided an equalizer header 75 which extends longitudinally of the boiler structure and is connected in parallel to the drums of the respective boiler units by pipes 76. By this arrangement liquid may flow from one drum to another through the pipes 76 and the header so that always substantially the same liquid level obtains in each of the boiler units.

In a boiler of this type, the gases pass from the tubes at a high temperature which means that the gases flowing over the boiler drums 13 are of a high temperature. To protect the drums from the temperature of these gases, the drums are covered with a suitable lagging material 77 capable of withstanding the temperatures met with. The lagging material may be placed on the drums in sections of convenient size, being provided with openings through which tubes 23 extend, and it may be fastened in place in any suitable manner. The important thing is that it be so fastened in place that with the severe operating conditions met with it will not come off. At the underside of the drums, it is fastened in position by overlapping metal plates 78 held in place by suitable studs 79, the metal plates being formed of a metal capable of withstanding the high temperatures met with. For this purpose, any suitable temperature resisting metal, such as one of the known high temperature resisting steel alloys, may be used. At the sides and top of the drums the lagging material may be held in place by thin steel plates 80 suitably fastened in position and covered with a suitable heat insulating cement 81. The cement 81 covers and protects the studs 79 located at the sides of the drums. The studs 79 located directly beneath the units are protected by the usual soot blower pipe 82 and its shield 83.

In operation, liquid is supplied to the boiler units through the respective feed pipe 53 and is maintained at a level between the upper and lower surfaces of blocks 45. The major portion of the liquid is between the bottoms of blocks 45 and baffle plate 36, but a small amount being required to fill the narrow spaces between the blocks. The liquid from above baffle plate 36 runs down through the passages 39 to the passages 28 in cores 24 and is fed through these passages to the bottoms of tubes 23. From the bottom of each tube 23 the flow is upward through the annular vertical passage between tube 23 and the core. Thus it will be seen that in each boiler tube, the down passage 28 supplies liquid to the surrounding annular vertical passage through which the flow is upward. Heat is imparted to the liquid as it flows upward through the annular vertical passages, and part way up the tubes the liquid will have absorbed sufficient heat and the pressure will have decreased to an extent such that the liquid boils, forming mercury vapor. The circulation is rapid and there is discharged from the upper ends of tubes 23 a mixture of vapor and liquid mercury. The outflowing vapor and liquid strikes the underside of baffle plate 36 and flows sidewise in each direction up around the side edges of baffle plate 36 and thence toward the upper portion of the drum. Here it strikes the plate sections 50 and flows along beneath them to passages 52 and thence up through the passages and thence to discharge pipes 5. In striking the plate sections 50 the direction of flow of the vapor is changed and particles of liquid in the vapor tend to strike this plate and drop down into the lower section of the boiler drum. The plate sections 50 thus serve to separate liquid from the vapors so that the vapors flowing through passages 52 are practically free from liquid. After the vapors flow through passages 52, the direction of flow is again changed as they flow toward pipes 5, a thing which tends further to separate out liquid particles. The liquid particles thus separated out drop down on the top surfaces of plate sections 50 and flow back to the lower portions of the boiler through passages 52.

The provision of the baffle plate 36 serves to keep the liquid supply separate from the mixture of mercury and vapor flowing from the upper ends of annular passages 29 so that such outflowing mixture does not interfere with the flow of liquid through the baffle plate passages 39 to core passages 28. This is an important consideration for it is essential to have rapid and uninterrupted circulation of mercury maintained continuously in order to absorb and carry away the heat fast enough that boiling does not occur at the bottoms of the tubes, and that the passages 28 be maintained full of mercury in order to increase the pressure of the mercury at the lower ends of the tubes and hence raise its boiling point. If the flow is interrupted and boiling does occur at the bottoms of the tubes, burning of the tubes may occur.

It will be noted that the respective boiler units are arranged side by side and that each is independent of the others, the only thing in common being their connections to the liquid supply, equalizing header and vapor drum 9. With this arrangement, a boiler of a desired capacity may be built by using a suitable number of boiler units, and at any time a unit may be repaired or replaced without disturbing the remaining units.

The units are arranged directly over the fire box so that the products of combustion pass vertically over the boiler tubes. With this arrangement, an even distribution of heat is ensured to each of the boiler tubes and to each of the boiler units. As seen particularly from Figs. 5 and 6 the boiler tubes are connected to the drums 4 in staggered relation to each other and flare outwardly relatively to each other. The staggered arrangement permits of a larger number of tubes being conected to the drums and the flared construction serves to permit radiant heat from the furnace to penetrate between the tubes to a greater extent. By flaring the tubes a greater or lesser amount the distribution of radiant heat to the tubes can be varied. The tubes are spread sufficiently to give the results desired in any particular instance. Also, the spread of the tubes serves to effect a more constant gas velocity throughout the length of the tubes and hence a more even distribution of the heat to the tubes. The spread of the tubes is such that the lower ends of all the tubes of the entire structure are subsantially equally spaced apart. This will be clear from Fig. 6 wherein it will be noted that the lower ends of the outer row of tubes of adjacent boiler units are spaced substantially the same as are the other tubes.

In Figs. 11 to 18 is shown a modified boiler construction embodying our invention. Referring to these figures, 101 indicates the furnace in which the boiler is mounted and 102 indicates an oil burner. The products of combustion pass vertically upward to the top of the furnace and are discharged therefrom through a conduit 103.

The boiler comprises a number of units 104 each complete in itself. These units are mounted side by side in the furnace and are arranged to deliver elastic fluid to a common header or drum 105, from which it is conveyed to the point of consumption by a conduit 105ª. They may be supported in the furnace in any suitable manner. In the present instance they are shown as being suspended from I-beam 106 by means of hangers 107.

Each boiler unit comprises tube plate 108 to the upper side of which is fastened a casing 109. Casing 109 is fastened to plate 108 preferably by welding and is entirely closed at its top and ends. The lower portion of casing 109 is somewhat wider than the upper portion, the lower portion forming a liquid space 110 and the upper portion a vapor space 111. Extending crosswise of casing 109 are a number of rods 112 which function to strengthen the casing. Located between the liquid space and the vapor space is a partition plate or baffle plate 113 which extends from one end of the boiler unit to a point short of the other end, defining a passage 114 through which vapor flows from space 110 to space 111.

Depending from tube plate 108 are a number of boiler tubes, each comprising an outer tube 115 and a core or inner tube 116. The outer tubes 115 are closed at their bottoms and at their tops they are fastened in openings in plate 118 preferably by welding as is indicated at 117. Tubes 115 taper inward slightly from their upper ends down to a point 118 just short of their lower ends after which they taper quite rapidly, forming a sort of pointed nose 119 at the bottom of each tube. Each core 116 comprises a thick walled tube of the same general contour as the outer tube. It is held in spaced relation to the outer tube by suitable means, such as a number of longitudinally-extending ribs 121. Preferably the outer surface of the core is straight while the ribs are tapered to correspond to the taper of outer tube 115 as this arrangement is of advantage from a manufacturing standpoint. The lower ends of cores 116 terminate short of the bottoms of outer tubes 115 whereby the inner passages 122 through the cores communicate at their lower ends with the spaces between the outer tubes 115 and the cores 116. The longitudinally-extending ribs 121 serve to define a plurality of circumferentially-spaced, vertical passages, which passages taper from their upper ends downwardly, being largest at their upper ends. Thus the lower end of each outer tube 119 is connected to the region directly above plate 108 by a plurality of tapered, vertical passages. Ribs 121 are of appreciable width so as to occupy in all considerable space. This serves to decrease the amount of liquid required to fill the tubes, a thing of importance when a liquid such as mercury is being vaporized.

Cores 116 may be formed with advantage from two spaced tubes 123 and 124 welded together at their upper and lower ends. The dead space between tubes 123 and 124 may be filled with air or with other desired substance. The inner tube 124 is bent between its ends as is shown in Fig. 12 so that it may give in case of unequal expansion between tubes 124 and 123, thus avoiding subjecting the welds at the ends of the tubes to large stresses. Cores 116 are loose in outer tubes 115 and float on the liquid therein.

The inner surfaces of the lower ends of tubes 115, that is the tapered noses 119, are provided with spaced, longitudinally extending ribs or projections 124ª as best seen in Figs. 12 and 16. These serve to increase the area of the metal in contact with the liquid in the tube to effect a more rapid transfer of heat from the metal to the liquid.

Extending across the bottom of liquid space 110 and in spaced relation to the tube plate 103 is a baffle plate 125 supported on spacing cylinders 126, arranged along the two side edges of plate 125. In baffle plate 125 are openings 127 which communicate with the central passages 122 in the cores and serve to direct liquid to such passages. In the under surface of plate 125 are recesses 128 in which the upper ends of cores 116 are located, and in which they are held by the buoyant action of the liquid in the tubes. As will be noted from Fig. 12, the upper ends of passages 122 in the cores are flared outwardly and the edges of openings 127 are curved outwardly in continuation thereof. This provides funnel-shaped entrances through which the liquid flows to passages 122, an arrangement which serves to feed the liquid rapidly to the passages so as to keep them full at all times.

Arranged above baffle plate 125 is a liquid displacement structure comprising a number of spaced rectangular blocks 129 which extend crosswise of liquid space 110 and are supported at their ends on two outer longitudinally-extending strips 130 which rest on the longitudinal edges of baffle plate 125, and a middle strip 131 which rests on the central portion of plate 125. Strips 130 are fastened to baffle plate 125 by studs 132 which are formed integral with spacing cylinders 126. Studs 132 extend through openings in baffle plate 125 and screw into tapped openings in strips 130, the strip being thickened at these points by means of pieces 133 which are welded to them so as to provide sufficient material to receive studs 132. Blocks 129 are fastened to strips 130 and 131 by welding. It will thus be seen that spacing cylinders 126, baffle plate 125, strips 130 and 131, and blocks 129 form a structure which may be assembled as a unit and placed on tube plate 108. This structure is fastened to the tube plate by a number of stay bolts 134.

Liquid mercury is supplied to the boiler units from an equalizing header 135 which is connected to each boiler unit by a feed pipe 136. Liquid is supplied to equalizer header 135 by a supply pipe 137 leading from any suitable source of liquid supply. By connecting feed pipes 136 all to a common header 135, the levels of the liquid in the respective boiler units will be the same, the levels being equalized by reason of their connection to the common header.

The vapor space 111 of each boiler is connected to vapor drum 105 by a plurality of pipes 138 which extend from the front end of the unit along its sides to its rear end where they connect to a vertical conduit 139 which in turn is connected to drum 105 at its upper end. Pipes 138 serve to provide a flexible connection between the boiler units and drum 105 and also serve as heating tubes, the vapor in passing through them being heated by the products of combustion. In other words, these tubes form superheater tubes for the vapor.

Connected to one or more of the boiler units is a liquid level gauge 140 which may be similar to the gauge shown in Figs. 7 and 8 for indicating the level of the liquid in the boiler.

The boiler units are mounted in the furnace a suitable distance apart and the tubes of each unit are flared so as to affect the desired equal spacing of the lower ends of the tubes. Between the groups of tubes are baffles 154 located well above the lower ends of the tubes and functioning after the manner of the baffles 74 shown in Figs. 5 and 6. The operation of the boiler shown in Figs. 11 to 18 is similar to that of the boiler shown in Figs. 1 to 10.

Liquid is supplied to the boiler units from equalizer header 135 through the respective conduits 136, and is maintained at a level between the upper and lower surfaces of blocks 129. The major portion of the liquid is between the bottoms of blocks 129 and baffle plate 125, but a small amount being required to fill the narrow spaces between the blocks. The liquid from above baffle plate 125 runs down through the openings 127 to the passages 122 in cores 116 and is fed by these passages to the bottoms of tubes 115. From the bottom of each tube 115, the flow is upward through the spaced vertical passages between ribs 121. Thus it will be seen that in each boiler tube, the down passage 122 supplies liquid to a plurality of vertical tapered up passages. Heat is imparted to the liquid as it flows upward through the vertical passages and partway up the tubes, the liquid will have absorbed sufficient heat to boil and vaporize after the manner explained in connection with Figs. 1 to 10. The vapor strikes the underside of baffle plate 125 and flows sidewise in each direction up around the side edges of baffle plate 125 and thence to the upper portion of liquid space 110. Here it strikes the baffle plate 113 and flows along it to passage 114 and then up through passage 114 to vapor space 111. In striking the baffle plate 113, the direction of flow of the vapor is changed and any particles of liquid in the vapor tend to strike this plate and drop down on to the upper surface of baffle plate 125. The baffle plate 113 thus serves to separate liquid from the vapors so that the vapors flowing through passage 114 are particularly free from liquid. From vapor space 111, the vapor flows out through pipes 138 to vertical conduit 139 and thence to header 105 from which it is fed to the point of consumption for the vapors. The vapors may be used to operate an elastic fluid turbine or for heating or other industrial purposes.

The provision of the baffle plate 125 serves to keep the liquid separate from the vapor so that the vapor does not interfere with the flow of liquid into the down tube passages 122. This is an important consideration for as pointed out in connection with Figs. 1 to 10, it is essential that a rapid and uninterrupted circulation of the liquid be maintained continuously in order to prevent burning of the tubes.

In accordance with the provisions of the patent statutes, we have described the principle of operation of our invention, together with the apparatus which we now consider to represent the best embodiment of our invention, but we desire to have it understood that the apparatus shown is only illustrative and that the invention may be carried out by other means.

What we claim as new and desire to secure by Letters Patent of the United States, is:

1. A mercury boiler comprising a plurality of units mounted side by side in spaced relation to each other, each unit comprising a casing and tubes depending therefrom, said tubes being flared outwardly relatively to each other so that the lower ends of all the tubes are substantially equally spaced, baffle plates for directing the products of combustion vertically upward through the spaces between the tubes and casings, and means providing a conduit located beyond the boiler units as regards the direction of flow of the products of combustion for conveying away the products of combustion.

2. A mercury boiler comprising a furnace having a combustion chamber, a plurality of similar boiler units mounted therein in spaced relation to each other and directly over the combustion chamber, each unit comprising a casing to which liquid is supplied and a plurality of flared boiler tubes depending therefrom, each tube being closed at its lower end and such lower ends being substantially equally spaced apart and independent of each other, whereby the lower ends of all the tubes are equally exposed to the radiant heat of the furnace, means defining a conduit for conveying away products of combustion, said conduit being located beyond the boiler units as regards the flow of the products of combustion, whereby the products of combustion pass vertically upward over said tubes and casings, and baffle means for directing the products of combustion through the spaces between said tubes.

3. In a mercury boiler, a boiler tube comprising an outer tube and a core therein, said core comprising inner and outer spaced tubes fastened together at their ends, the inner tube being bent between its upper and lower ends whereby it is rendered capable of expansion and contraction relatively to the outer tube.

4. In a mercury boiler, a boiler tube comprising an outer tube, a core therein having a central, vertical passage, projections located between the outer tube and core to hold them in spaced relation to each other, and a member which engages the core and is fastened to the outer tube for holding the core down in the outer tube.

5. In a mercury boiler, a boiler tube comprising an outer tube, a core therein having a central, vertical passage, projections located between the outer tube and core to hold them in spaced relation to each other, and a member fastened to the outer tube above the top of the core constructed and arranged for holding the core down in the outer tube.

6. In a mercury boiler, a casing having openings therein, boiler tubes which project through said openings and are welded to the casing at the inner edges of said openings, and cores in said tubes, said cores comprising spaced inner and outer tubes united at their ends to provide sealed dead air spaces.

7. In a mercury boiler, a casing having openings therein, boiler tubes which project through said openings and are welded to the casing at the inner edges of said openings, cores in said tubes, and means for holding the cores in spaced relation to the boiler tubes.

8. A mercury boiler unit comprising a casing, a plurality of tubes depending therefrom, a baffle plate in the casing, cores in said tubes, said cores being provided with down passages, and said baffle plate being provided with openings which communicate with said down passages, filler block means in the liquid space above said baffle plate, said filler block means being spaced from said baffle plate to provide a liquid space between the lower surface of the filler block means and the top surface of the plate, and a liquid level gauge connected to the casing in the region of the filler block means for indicating the level of the liquid in the unit.

9. A mercury boiler unit comprising a casing, a plurality of tubes depending therefrom, a baffle plate supported in the liquid space of the casing in spaced relation to the casing wall, cores in said tubes which stand in spaced relation thereto, said cores being provided with down passages and said baffle plate being provided with openings which communicate with such passages, and filler blocks in the liquid space above said baffle plate, said filler blocks being spaced vertically from the upper surface of said baffle plate to provide a continuous liquid space for supplying liquid to the down passages, and said blocks being spaced from each other to provide relatively narrow liquid spaces whereby a comparatively small change in the quantity of liquid in the boiler produces a relatively large change in the liquid level.

10. A mercury boiler unit comprising a casing, a plurality of tubes depending therefrom, a baffle plate in the casing, cores in said tubes, said cores being provided with down passages and said baffle plate being provided with openings which communicate with said down passages, and filler blocks in the liquid space above the baffle plate, said blocks being spaced from the baffle plate and from each other.

11. A mercury vapor generator comprising a furnace having a combustion chamber, a plurality of boiler units each comprising a casing and a plurality of rows of tubes extending longitudinally along the under side of the casing and depending therefrom, mounted directly over the combustion chamber, said tubes entering the casing in a generally radial direction so that the tubes are flared from each other in a direction transverse to the axis of the casing, the lower ends of the tubes of each unit being substantially equally spaced from each other, said casings being spaced laterally with relation to each other at such a distance that the lower ends of the tubes of the outer rows of adjacent units are spaced from each other a distance substantially the same as the distance between the lower ends of the tubes of each unit whereby the lower ends of all the tubes are arranged in substantially equally spaced relation directly over the combustion chamber, and means for conveying away the products of combustion constructed and arranged so that the products of combustion pass upward along said tubes.

12. A mercury vapor generator comprising a furnace having a combustion chamber, a boiler unit mounted therein directly over the combustion chamber, said unit comprising a casing and a plurality of rows of tubes extending longitudinally along the under side of the casing and depending therefrom, means for supporting said casing independently of said tubes, said tubes being relatively close together at their upper ends and the rows of adjacent tubes being flared with respect to each other in a direction transverse to the longitudinal axis of the casing, the lower ends of said tubes being substantially equally spaced from one another, equally exposed directly to the radiant heat of the furnace and equally heated, and means including baffles for effecting the flow of products of combustion upward through the spaces between the tubes, said tubes each including an outer tube and a heat-insulated core therein having a down passage for the flow of mercury from the casing to the lower end of the tube, said core being spaced from the inner wall of the outer tube to provide a passage for the upward flow of mercury and mercury vapor from the lower end of the tube to the casing, and means in the casing for preventing the flow of mercury and mercury vapor from said annular passage from interfering with the flow of mercury into the down passage.

13. A mercury boiler unit comprising a casing, a plurality of tubes depending therefrom, a baffle plate in the casing, cores in said tubes, said cores being provided with down passages, and said baffle plate being provided with openings which communicate with said down passages, and filler block means in the liquid space above said baffle plate, said filler block means being spaced from said baffle plate to provide a liquid space between the lower surface of the filler block means and the top surface of the plate.

WILLIAM L. R. EMMET.
BEVIS P. COULSON, Jr.